United States Patent
Jägel

(10) Patent No.: US 12,352,897 B2
(45) Date of Patent: Jul. 8, 2025

(54) OPTOELECTRONIC SENSOR AND METHOD OF DETECTING OBJECTS

(71) Applicant: SICK AG, Waldkirch (DE)

(72) Inventor: Matthias Jägel, Waldkirch (DE)

(73) Assignee: SICK AG, Waldkirch (DE)

( * ) Notice: Subject to any disclaimer, the term of this patent is extended or adjusted under 35 U.S.C. 154(b) by 1149 days.

(21) Appl. No.: 17/152,984

(22) Filed: Jan. 20, 2021

(65) Prior Publication Data
US 2021/0239804 A1    Aug. 5, 2021

(30) Foreign Application Priority Data
Jan. 30, 2020 (DE) .......................... 102020102247.6

(51) Int. Cl.
*G01S 7/481* (2006.01)
*G01S 17/08* (2006.01)
*G01S 17/89* (2020.01)

(52) U.S. Cl.
CPC .......... *G01S 7/4817* (2013.01); *G01S 7/4815* (2013.01); *G01S 17/08* (2013.01); *G01S 17/89* (2013.01)

(58) Field of Classification Search
CPC ...... G01S 7/4817; G01S 7/4815; G01S 17/08; G01S 17/89; G01S 7/4816; G01S 7/4811; G02B 5/28
See application file for complete search history.

(56) References Cited

U.S. PATENT DOCUMENTS

| 5,598,263 A * | 1/1997 | Safa ..................... G01S 7/4817 359/220.1 |
| 2006/0187470 A1* | 8/2006 | Massey ................ G01S 7/4811 359/399 |

(Continued)

FOREIGN PATENT DOCUMENTS

| CN | 102870030 A | 1/2013 |
| CN | 105300348 A | 2/2016 |

(Continued)

OTHER PUBLICATIONS

DE 102015116568 A1 Translation (Year: 2017).*

(Continued)

*Primary Examiner* — Yuqing Xiao
*Assistant Examiner* — Jempson Noel
(74) *Attorney, Agent, or Firm* — Nath, Goldberg & Meyer; Jerald L. Meyer

(57) ABSTRACT

An optoelectronic sensor for the detection of objects in a monitored zone is provided that has a light transmitter for transmitting transmitted light of a wavelength range, a light receiver for generating a received signal from the transmitted light remitted at the objects, a reception optics arranged upstream of the light receiver and having an optical filter adapted to the wavelength range for the suppression of extraneous light that is arranged in the reception beam path where the remitted transmitted light forms parallel bundles of beams, and a control and evaluation unit that is configured to detect information on the objects from the received signal. The reception optics here is optimized for an annular image field having an image field angle α and the filter is optimized to a non-perpendicular angle of incidence of the remitted transmitted light corresponding to the image field angle α.

13 Claims, 4 Drawing Sheets

(56) References Cited

U.S. PATENT DOCUMENTS

Figure 1:
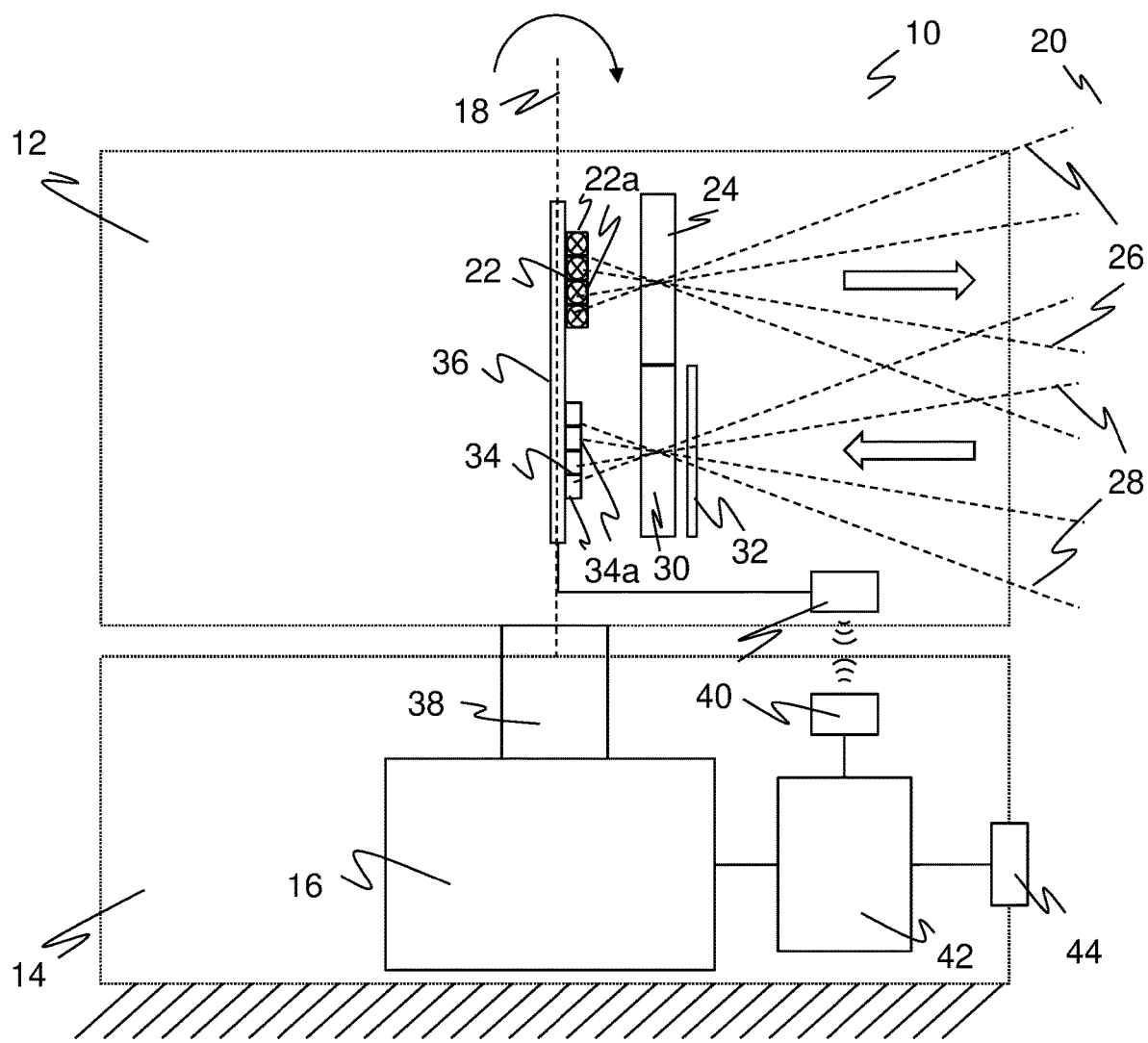

| | | | |
|---|---|---|---|
| 2017/0102461 A1* | 4/2017 | Tezuka | G01S 7/4863 |
| 2017/0199273 A1* | 7/2017 | Morikawa | G01S 7/497 |
| 2017/0289524 A1 | 10/2017 | Pacala et al. | |
| 2017/0323171 A1 | 11/2017 | Mehrl et al. | |
| 2019/0179028 A1* | 6/2019 | Pacala | G01S 17/42 |
| 2021/0003672 A1* | 1/2021 | Yokogawa | A61B 1/0655 |

FOREIGN PATENT DOCUMENTS

| | | | |
|---|---|---|---|
| CN | 107861317 A | | 3/2018 |
| CN | 110118959 A | | 8/2019 |
| DE | 69501072 T2 | | 3/1996 |
| DE | 19757849 B4 | | 12/2004 |
| DE | 202015101912 U1 | | 8/2016 |
| DE | 102015116568 A1 | * | 3/2017 |
| DE | 102016219955 A1 | | 4/2018 |
| DE | 102017012251 A1 | | 4/2019 |
| DE | 102018101846 A1 | | 8/2019 |
| DE | 102018125826 A1 | | 4/2020 |
| DE | 102018128630 A1 | | 5/2020 |
| DE | 102018118653 A1 | | 7/2020 |
| EP | 3699640 A1 | | 8/2020 |
| EP | 3521858 B1 | | 1/2021 |
| EP | 3809156 A1 | | 4/2021 |

OTHER PUBLICATIONS

"Laser Radar: Progress and Opportunities in Active Electro-Optical Sensing"; National Academy of Sciences; Washington D.C.; 2014.

* cited by examiner

OPTOELECTRONIC SENSOR AND METHOD OF DETECTING OBJECTS

The invention relates to an optoelectronic sensor and to a method of detecting objects in a monitored zone.

Many optoelectronic sensors work in accordance with the scanning principle in which a light beam is transmitted into the monitored zone and the light beam reflected by objects is received again in order then to electronically evaluate the received signal. The time of flight is here often measured using a known phase method or pulse method to determine the distance of a scanned object.

To expand the measured zone of a single-beam light scanner, the scanning beam can be moved, on the one hand, as is the case in a laser scanner. A light beam generated by a laser there periodically sweeps over the monitored zone with the help of a deflection unit. In addition to the measured distance information, a conclusion is drawn on the angular location of the object from the angular position of the deflection unit and the site of an object in the monitored zone is thus detected in two-dimensional polar coordinates.

Another possibility for expanding the measured zone and for acquiring additional distance data comprises simultaneously detecting a plurality of measured points using a plurality of scanning beams. This can also be combined with a laser scanner that then does not only detect a monitored plane, but also a three-dimensional spatial zone via a plurality of monitored planes. The scanning movement is achieved by a rotating mirror in most laser scanners. Particularly on the use of a plurality of sensing beams, however, it is also known in the prior art to instead have the total measurement head with the light transmitters and light receivers rotate, as is described, for example, in DE 197 57 849 B4.

Measures for noise suppression are taken to increase the measurement accuracy of such systems. The sun as a broadband source having a large CW lighting load on the light receiver and high noise associated therewith must above all be taken into account in the outdoor sector. Such extraneous light can be filtered by use of an optical bandpass filter that is adapted to the wavelength of the transmitted light and that in particular provides a considerable improvement of the signal-to-noise ratio with broadband extraneous light such as sunlight. The narrower the band of the bandpass filter can be made without damping the useful light the greater the advantage becomes. Such bandpass filters are built up from up to several hundred layers as interference filters with high quality.

The pass band of such a bandpass filter varies with the angle of incidence. Non-parallel beam bundle portions thereby effectively meet filter effects having different transmission ranges. If, however, the wavelength does not match the pass band, the bandpass filter also blocks useful light. Since it is actually the typical job of a reception optics to bundle the light and thus to produce a convergent optical path and not a parallel one, the angle of incidence range is relatively large as a rule. A particularly short focal length is particularly even required with compact sensors. The pass band of the bandpass filter is configured with a corresponding tolerance. This in turn limits the effective distinction of useful light and extraneous light.

Special optical components that parallelize the received light for the bandpass filter are therefore proposed in the optical path in the prior art. Diaphragm apertures and microlenses are provided for this purpose in US 2017/0289524 A1. The still unpublished German patent application having the file reference 102018118653.3 proposes a scattering axicon for this purpose. Additional components for the parallelization in the optical path, however, require construction space, increase costs, and contribute as further components to the increase of the tolerance chain.

In addition to the angle of incidence range, there are still further effects that counteract a selective filter effect. On the one hand, a drifting of the wavelength range of the useful light occurs in practice, mainly due to temperature effects of the light transmitter. A plurality of filter surfaces of a different pass band are provided in this still unpublished German patent application having the reference number 102018128630.9. Those receiver elements from a plurality of receiver elements are then further evaluated where the associated filter surface corresponds particularly well to the useful light. Another effect is that the filter is not ideally oriented overall due to installation tolerances and the like. The still unpublished European patent application having the file reference 19158077.8 therefore provides an adjustment device to tilt the filter. In both cases, however, the angle of incidence range is not reduced, i.e. the filter still has to be configured as wide enough that non-parallel received light can pass through.

The still unpublished German patent application having the file reference 102018125826.7 deals with a two-lens objective for a multi-beam laser scanner. The objective is configured for an annular image field and a high objective quality is achieved despite the small number of lenses due to this restriction of the demands. The annular image field in turn signifies practically no restriction when the light sources and reception elements form a matching circular arrangement. The latter is also already described in the somewhat older DE 10 2018 101 846 A1. However, no filters for extraneous light suppression are discussed in each case.

It is therefore the object of the invention to further improve the measurement accuracy of a sensor of the category.

This object is satisfied by an optoelectronic sensor and by a method for the detection of objects in a monitored zone in accordance with the respective independent claim. A light transmitter generates transmitted light in a specific wavelength range and, after remission at the objects, corresponding remitted transmitted light or received light is converted into a received signal by a light receiver. A control and evaluation unit evaluates the received signal to acquire information on the objects.

A reception optics that guides the received light onto the light receiver has a filter adapted to the wavelength of the transmitted light for extraneous light suppression to allow, where possible, only the remitted transmitted light to pass through and to mask extraneous light from outside this spectrum. This filter is arranged in the received beam path where the incident received light is parallel. Parallel here does not make any strictly mathematical demand, but rather a particularly narrow angle of incidence range, for example of a few degrees, at most one degree, or even only a few tenths or one tenth of a degree.

The invention starts from the basic idea of providing by the reception optics that said suitable location for the filter is present at all in the received beam path. As explained in the introduction, the reception optics typically has the task of bundling the received light such that it is actually not parallel. Conventionally, additional optical elements are therefore required that separately produce a parallel optical path.

In accordance with the invention, the reception optics is optimized for an annular image field having the image field angle α. This can be expressed such that the reception optics is optimized to a decentered, off-axis image field point. The filter is in turn optimized to this image field angle α or to the off axis image field point and thus to a non-perpendicular angle of incidence. The specific design of the reception optics thus provides a particularly suitable position for a suitably designed filter with parallel or at least almost parallel received light.

The invention has the advantage that the dependence of the filter on the angle of incidence is practically eliminated by the parallel received light. The filter can therefore allow useful light to pass and block extraneous light in a particularly selective manner so that the signal-to-noise ratio considerably improves. A particularly narrow band optical bandpass filter can be used, for example, in particular in a common design as an interference filter, without having to use additional optical components or construction space. The filter can be very specifically optimized for the individual angle of incidence that corresponds to the image field angle α.

The reception optics preferably has a first lens and a second lens, with the first lens being configured such that light beams of a single reception point only impact half of the second lens with an image field angle α, Such light beams, and indeed preferably all the light beams with an image field angle α, are accordingly only located at the level of the second lens at one respective side of the optical axis. Light beams from field points disposed opposite with respect to the optical axis do not overlap one another in the plane of the second lens. They just no longer illuminate the center of the second lens. Unlike conventional objectives, no large contiguous range of image field angles are therefore used here such as $-\alpha \ldots 0° \ldots \alpha$, but only a single discrete image field angle α. The image field angle α can include a certain tolerance environment within which these properties are still just sufficiently satisfied.

The reception optics preferably comprises only these two lenses and no further lenses, that is it is only a two-lens objective. The two lenses are preferably converging lenses. A two-lens objective is simpler to produce and to adjust than a three-lens or multi-lens objective. The degrees of freedom of design are more limited for this purpose, but are utilized in this embodiment such that the demands of the sensor are still satisfied despite the lower effort. This is successful in that sharply limited beams are not required everywhere, but rather only on an annular ring corresponding to the image field angle α. The two-lens objective, unlike multi-lens objectives, even still makes possible a large aperture with k≤2 or even k=1, that is a small f-number and thus a large aperture and a large measurement range.

The inequality $d \geq (D1*f1)/(D1+2*f1*\tan \alpha)$ is preferably satisfied for the reception optics, with a focal length f1 and a diameter D1 of the first lens and a distance d between the first lens and the second lens. The distance d is here preferably measured between the main plane of the first lens and the first effective lens surface of the second lens, that is of that lens surface that faces the first lens. This is a mathematical formulation for the already presented condition that lights beams having an image field angle α are only incident on half of the second lens.

Equality, i.e. $d=(D1*f1)/(D1+2*f1*\tan \alpha)$, preferably even applies at least approximately. At least approximately means that a certain tolerance of, for example, 5% or 10% is still possible and the properties of the optics do not change abruptly. It is rather a question of still observing a distance that is as large as possible of the second lens from the image plane of the optics under the condition of the inequality so that the second lens can also develop a still noticeable effect. The equality is here an optimum in the sense that this distance is maximized and this optimum can also only be approximately reached with said tolerance.

The focal length f2 of the second lens preferably corresponds to the distance between the first lens and the second lens. The two-lens objective then becomes telecentric at the image side. The distance between the first lens and the second lens is preferably not the already introduced distance d at this point, but rather the distance d' between the main planes of both lenses differing by approximately half the center thickness of the second lens. This does not, however, necessarily have to be observed in this manner. In a similar manner to that discussed in the previous paragraph, a focal length f2 also already brings about advantages approximately similar to the distance between the first and second lenses; the two-lens objective is then at least almost telecentric at the image side and at least one tolerance can easily be accepted within the framework of half the center thickness.

The first lens preferably has a large f-number k1, in particular k1=1. It is an advantage of a two-lens objective with respect to multi-lens objectives that this is possible at all. This selection of k1 also results in a small value k for the f-number of the total objective. A particularly sensitive sensor with a long range can be implemented with such a large f-number.

The reception optics preferably does not have any additional optical element for the parallelization of the bundles of rays of the remitted transmitted light incident on the filter. Such an additional optical element is not required in accordance with the invention and costs and construction space can therefore be saved. The reception optics in accordance with the invention already provides the parallelization of the optical path with its main task of beam guidance onto the light receiver thanks to the optimization to an annular image field.

The filter is preferably arranged in front of the remaining elements of the reception optics. This arrangement relates to a perspective of the incident received light that is first incident on the filter, then on the actual reception optics and its lenses, and finally on the light receiver. Conventionally, in contrast, the received light would first be parallelized in front of filter by a portion of the reception optics.

The filter preferably has a narrow pass band only for the non-perpendicular angle of incidence corresponding to the image field angle α. The filter is thus adapted to only this one angle of incidence. The optical filter is preferably a bandpass filter. It therefore cuts off the extraneous light with both small and large wavelengths. A conventional broader pass band for a larger range of angles of incidence is not required. The optical filter preferably has a pass band with a full width at half maximum of at most 40 nm, at most 30 nm, at most 20 m, or at most 10 nm. These are some values for a pass band that is too narrow according to a conventional standard with a reserve for a larger angle of incidence range.

The light transmitter is preferably configured to transmit a plurality of mutually separate light beams starting from a respective transmission point and the light receiver is preferably configured to generate respective received signals from the remitted light beams incident at a reception point. The sensor thus becomes a multi-beam sensor or multiple sensor that scans a plurality of measurement points. A multi-plane scanner is produced in a preferred further development. The plurality of measurement beams preferably share the same reception optics and the same filter. The objective design in accordance with the invention also enables the arrangement of the filter for a plurality of measurement beams in the optical path where the received light is parallel and thus enables a particularly effective extraneous light suppression.

Each transmission point is effectively a light transmitter from which the respective transmitted light beam originates, with it, however, initially not being absolutely necessary that physical light transmitters are seated at the transmission points. A physical light transmitter can instead also generate a plurality of transmitted light beams at a plurality of or at all the transmission points by beam splitting, for example. The transmitted light beams are furthermore not to be understood as beams in the sense of geometrical optics within a larger bundle of rays, but rather as mutually separate light beams and thus isolated scanning beams that generate correspondingly isolated, mutually spaced apart light spots in the monitored zone on incident on an object. In a similar manner to the statements on the transmission points, the reception points are effectively light receivers without a light receiver physically having to be seated at each reception point. Respective light receivers are nevertheless preferably provided or the light receiver has a pixel matrix and only the pixel or pixels at the reception points is/are used to acquire a received signal. The remaining pixels possibly also generate signals that are, however, ignored or not read.

The transmission points and/or the reception points are preferably arranged on a circular line. The circular lines or annuli correspond to the image field angle α for which the reception optics is designed. With this mutually matching arrangement of transmission points or reception points and the reception optics, its optimized properties are actually used while design compromises possibly accepted in turn no longer have any practical effect for other image field angles. A circular arrangement of the transmission points and reception points in particular seems counterproductive at first glance for a laser scanner since a one-dimensional arrangement on a simple line with which a plane group is then scanned by a rotational movement would be sufficient there. However, the line, unlike a circular line, could not be imaged over the required large image zone by a two-lens object with the high quality in accordance with the invention. There is then additionally not the possibility of in particular arranging the filter for a plurality of scanning beams at a position where the received light is parallel. It is also possible with transmission points and/or reception points arranged to form a circular line to scan planes arranged equidistantly in a laser scanner since the offset in the direction of rotation of the laser scanner only effects a time offset of the measurement that can also be compensated if required.

The circular line is preferably centered about the optical axis. The light beams then each undergo the same beam shaping effects and deflection effects with rotationally symmetrical properties of the reception optics. The light transmitter and the light receiver can form a coaxial arrangement in which the reception optics simultaneously acts as a transmission optics. This produces a particularly compact design.

The sensor is preferably configured as a laser scanner and has a moving deflection unit with whose aid the transmitted light is conducted through the monitored zone. The laser scanner scans the monitored zone in a plurality of zones with a plurality of transmitted light beams with the movement of the moving deflection unit. The deflection unit is preferably configured in the form of a rotatable scanning unit that practically forms a movable measurement head in which light transmitters and/or light receivers and preferably also at least some of the control and evaluation unit is accommodated.

The evaluation unit is preferably configured to determine a distance of the objects from a time of flight between the transmission of the transmitted light and the reception of the remitted transmitted light. The sensor thereby becomes distance measuring. Alternatively, only the presence of an object is determined and is output as a switching signal, for example.

The method in accordance with the invention can be further developed in a similar manner and shows similar advantages in so doing. Such advantageous features are described in an exemplary, but not exclusive manner in the subordinate claims dependent on the independent claims.

Figure 2A:
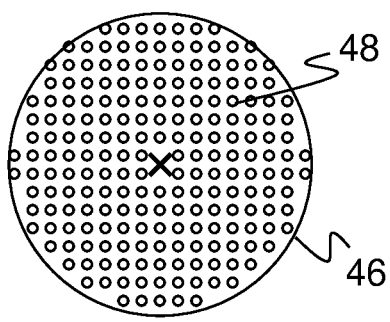
Figure 2B:
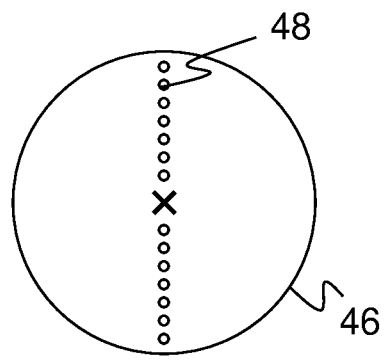
Figure 2C:
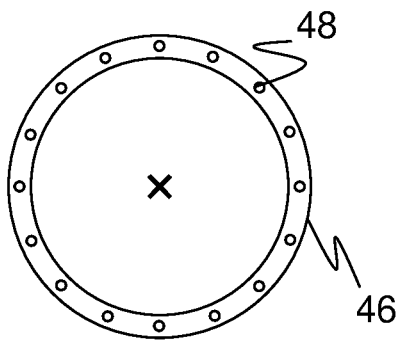
Figure 3:
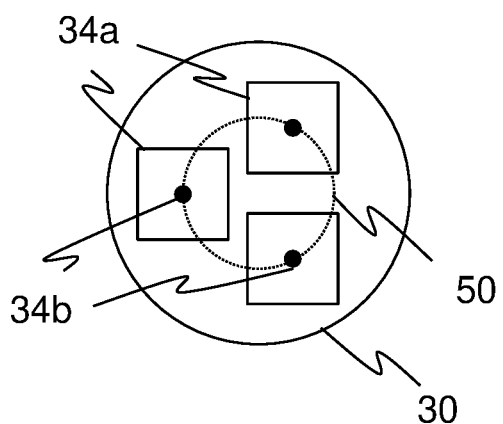
Figure 4:
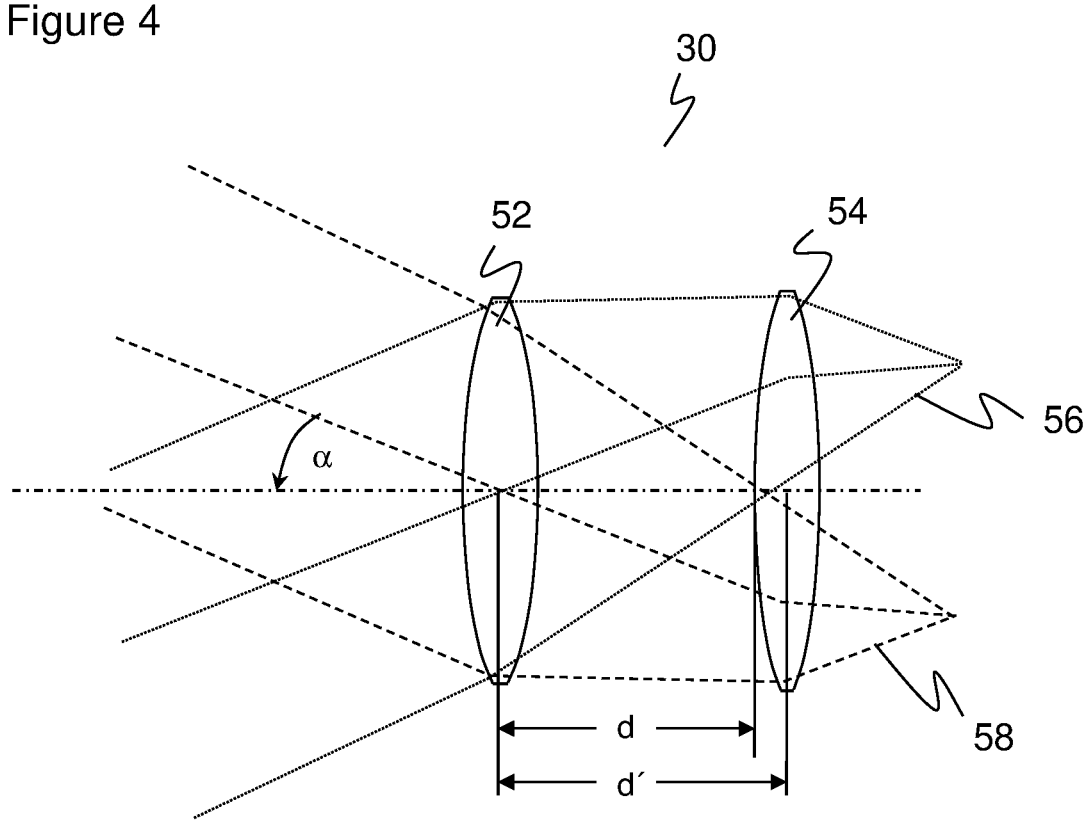
Figure 5:
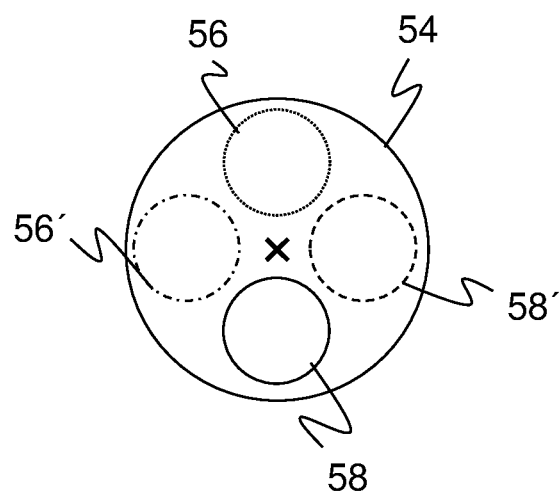
Figure 6:
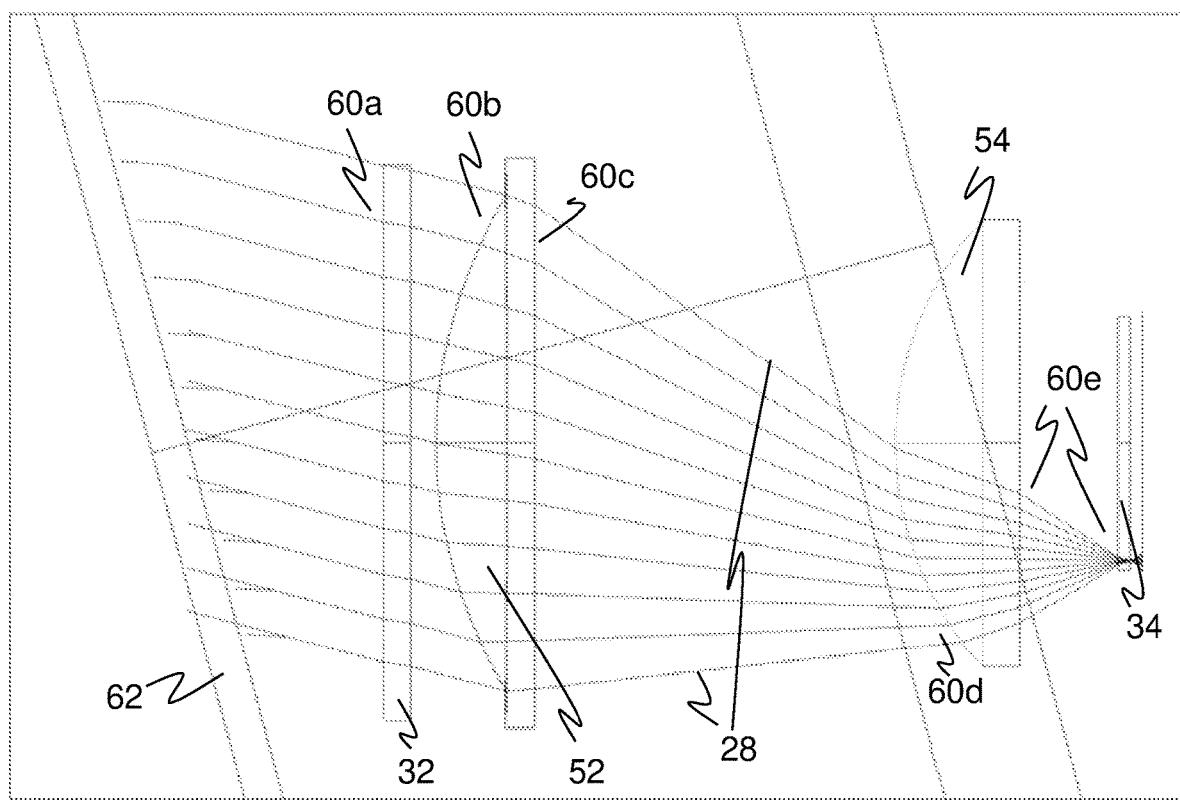

The invention will be explained in more detail in the following also with respect to further features and advantages by way of example with reference to embodiments and to the enclosed drawing. The Figures of the drawing show in:

FIG. 1 a schematic sectional representation of a laser scanner;

FIG. 2a a schematic view of a circular arrangement of image field points;

FIG. 2b a schematic view of a linear arrangement of image field points;

FIG. 2c a schematic view of a circular arrangement of image field points;

FIG. 3 a plan view of circularly arranged transmission points and reception points;

FIG. 4 a schematic view of a two-lens objective for a circular image field with exemplary beam progressions;

FIG. 5 a schematic plan view of the second lens of the objective in accordance with FIG. 4 to illustrate the optical effect of the first lens; and FIG. 6 the reception beam path at an embodiment of a reception optics with a filter.

FIG. 1 shows a schematic sectional representation through an optoelectronic sensor 10 in an embodiment as a laser scanner. The sensor 10 in a rough distribution comprises a movable scanning unit 12 and a base unit 14. The scanning unit 12 is the optical measurement head, whereas further elements such as a supply, evaluation electronics, terminals and the like are accommodated in the base unit 14. In operation, the scanning unit 12 is set into a rotational movement about an axis of rotation 18 with the aid of a drive 16 of the base unit 14 to thus periodically scan a monitored zone 20.

In the scanning unit 12, a light transmitter 22 having a plurality of light sources 22a, for example LEDs or lasers in the form of edge emitters or VCSELs, generates with the aid of a transmission optics 24 only shown purely schematically a plurality of transmitted light beams 26 having a mutual angular offset that are transmitted into the monitored zone 20. If the transmitted light beams 26 impact an object in the monitored zone 20, corresponding remitted light beams 28 return to the sensor 10. The remitted light beams 28 are conducted by a reception optics 30 likewise shown purely schematically and having a filter 32 for extraneous light suppression arranged upstream onto a light receiver 34 having a plurality of light reception elements 34a that each generate an electric received signal. The light reception elements 34a can be separate elements or pixels of an integrated matrix arrangement, for example photodiodes, APDs (avalanche diodes), or SPADs (single photon avalanche diodes).

The light transmitter 22 generates transmitted light beams 26 in a specific wavelength range to which the filter 32 is adapted. A very tightly bounded wavelength range of the transmitted light beams 26 is possible using suitable light sources, in particular lasers. The light wavelengths used are typically between 200 nm and 2000 nm. In particular at 660 nm, 850 nm, 900 nm, and 1550 nm. Extraneous light outside the useful light band defined by the wavelength range is blocked by the filter 32.

The purely exemplary four light sources 22a and light reception elements 34a are shown above one another in the sectional view. In actual fact, at least one of the groups is arranged in preferred embodiments of the invention in a circular figure or on a circular line, as will be explained further below. However, this does not have to relate to physical light sources 22a and light reception elements 34a, but only to the effective transmission points, that do, however, agree therewith here, as starting points of the transmitted light beams 26 and reception points as end points of the remitted light beams 28. Differing from FIG. 1, it is conceivable to generate a plurality of transmission points with a physical light source or to accommodate a plurality of reception points on the same physical reception module. In another respect, a plurality of transmitted light beams 26 do not necessarily have to be produced nor a plurality of remitted light beams 28 received, but a single-beam system is rather also conceivable.

The light transmitter 22 and the light receiver 34 are arranged together in the embodiment shown in FIG. 1 on a circuit board 36 that is disposed on the axis of rotation 18 and that is connected to the shaft 38 of the drive 16. This is only to be understood by way of example; practically any desired numbers and arrangements of circuit boards are conceivable. The basic optical design with a light transmitter 22 and a light receiver 34 biaxially disposed next to one another is also not compulsory and can be replaced with any construction design known per se of single-beam optoelectronic sensors or laser scanners. An example for this is a coaxial arrangement with or without beam splitters.

A contactless supply and data interface 40 connects the moving scanning unit 12 to the stationary base unit 14. A control and evaluation unit 42 is located there that can at least partly also be accommodated on the circuit board 36 or at another site in the scanning unit 12. The control and evaluation unit 42 controls the light transmitter 22 and receives the received signals of the light receiver 34 for a further evaluation. It additionally controls the drive 16 and receives the signal of an angular measurement unit which is not shown, which is generally known from laser scanners and which determines the respective angular position of the scanning unit 12.

The distance from a scanned object is measured for the evaluation, preferably using a time of flight process known per se. Together with the information on the angular position of the angular measurement unit, two-dimensional polar coordinates of all object points in a scanning plane are available after every scanning period with angle and distance. The respective scanning plane is likewise known via the identity of the respective transmitted light beam and its detection in one of the light reception elements 34a so that a three-dimensional spatial zone is scanned overall.

The object positions or object contours are thus known and can be output via a sensor interface 44. The sensor interface 44 or a further terminal, not shown, conversely serves as a parameterization interface. The sensor 10 can also be configured as a safety sensor for use in safety engineering for monitoring a hazard source such as a dangerous machine. In this process, a protected field is monitored which may not be entered by operators during the operation of the machine. If the sensor 10 recognizes an unauthorized intrusion into the protected field, for instance a leg of an operator, it triggers an emergency stop of the machine. Sensors 10 used in safety technology have to work particularly reliably and must therefore satisfy high safety demands, for example the standard EN13849 for safety of machinery and the machinery standard EN61496 for electrosensitive protective equipment (ESPE). The sensor interface 44 can in particular be configured as a safe output device (OSSD, output signal switching device) to output a safety-directed switch-off signal on an intrusion of a protected field by an object.

The sensor 10 shown is a laser scanner having a rotating measurement head, namely the scanning unit 12. In this respect, not only a transmission/reception module can rotate along; further such modules with a vertical offset or an angular offset with respect to the axis of rotation 18 is conceivable. Alternatively, a periodic deflection by means of a rotating mirror or by means of a facet mirror wheel is also conceivable. With a plurality of transmitted light beams 26, it must, however, be noted that how the plurality of transmitted light beams 26 are incident into the monitored zone 20 depends on the respective rotational position since their arrangement rotates by the rotating mirror as known geometrical considerations reveal. A further alternative embodiment pivots the scanning unit 12 to and fro, either instead of the rotational movement or additionally about a second axis perpendicular to the rotational movement to also generate a scanning movement in elevation.

The embodiment as a laser scanner is also exemplary. A multiple sensor without a periodic movement is also possible that then practically only comprises the stationary scanning unit 12 having corresponding electronics, but without a base unit 14, in particular as a variant of a flash LIDAR.

During the rotation of the sensor 10, a respective area is scanned by each of the transmitted light beams 26. A plane of the monitored zone 20 is here only scanned at a deflection angle of 0°, that is with a horizontal transmitted light beam not present in FIG. 1. The remaining transmitted light beams scan the envelope surface of a cone that is designed as differently acute depending on the deflection angle. With a plurality of transmitted light beams 26 that are deflected upward and downward at different angles, a kind of nesting of a plurality of hourglasses arises overall as a scanned structure. These envelope surfaces of a cone are here also sometimes called scanning planes in simplified terms.

The reception optics 30 shown only as a functional block in FIG. 1 is configured for an annular image field with an image field angle α in accordance with the invention. This will be explained in more detail with reference to FIGS. 2 to 5. FIGS. 2a-c first illustrate a motivation of this special optics design. A further motivation comprises a particularly favorable position for the filter 32 hereby being provided, which will be looked at in depth later with reference to FIG. 6.

In the ideal case, the reception optics 30 should, as in FIG. 2a, image all the image field positions 48 in focus within the image circle 46. A single lens, however, only does this for a very small image circle 46, whereas a corresponding objective would be too complex and would additionally bring about other optical limitations.

An areal imaging is not necessarily required for a laser scanner since scanning planes having a mutual offset in elevation are already produced by a linear arrangement of light sources 22a and light reception elements 34a. One optics would be sufficient for this purpose that provides a sharp imaging on a linear arrangement of image field positions 48 as in FIG. 2b. However, this is also only possible for larger image circles 46 using a complex objective.

Instead, in accordance with the invention the sharp imaging is only required for a single image field angle α such as is shown in FIG. 2c where the ring of the image field positions 48 corresponds to the image field angle α. The optics design is preferably oriented on the fixed image field angle α, which does not preclude the imaging also still being sharp in a certain environment; however, this is no longer a design demand for differing, and in particular smaller, image field angles. The image field angle α having a certain tolerance band of a sufficiently sharp imaging is as large as possible in FIG. 2c, for example α=±15°, to obtain distances that are large as possible between the beams 26, 28 of the sensor 10. A certain improvement of the angle covered, for example to ±8°, can already be achieved with a single beam by this restriction to a circular image field. This will, however, be improved considerably more with the two-lens configuration of the reception optics 30 explained below with reference to FIGS. 4 and 5.

FIG. 3 shows a preferred arrangement of light reception elements 34a on a circular line 50 in a plan view. As shown, the optical central axis of the reception optics 30 preferably passes through the center of the circular line 50. FIG. 3 could analogously also be shown for the transmission path; similar demands are made on the transmission optics 24. However, a filter 32 is preferably not provided in the transmission path since the light transmitter 22 is itself already able to generate transmitted light beams 26 in a narrow wavelength band.

Due to the arrangement on the circular line 50, only the circular image field corresponding to the image field angle α is effectively used by the reception optics 30. This arrangement is therefore particularly advantageous; exactly the optimized zones of the reception optics 30 are utilized. Aberrations of the reception optics 30 for image field angles differing from α are practically irrelevant.

A plurality of reception points 34b can be achieved by separate light reception elements 34a or by pixels or pixel zones of an integrated multiple arrangement of light reception elements 34a. FIG. 3 shows an example with three reception points 34b that are evenly distributed over the circular line 50 Differing numbers are also conceivable in an irregular arrangement.

FIG. 4 shows a schematic representation of an exemplary only two-lens objective of the reception optics 30 having a first lens 52 and a second lens 54, with both lenses 52, 54 preferably being converging lenses. A corresponding objective can also be used as a transmission optics 24 or, with a coaxial arrangement, as a common transmission/reception optics. It was explained above with respect to FIG. 2 that image field angles of up to ±18° are possible with a single lens optimized for an annular image field. The two-lens objective substantially improves this to ±20° and more.

Two exemplary light beams 56, 58 that are disposed opposite one another with respect to the optical axis and that correspond to the image field angle α are drawn in FIG. 4. The two-lens objective is also optimized to this image field angle α and the annular image field thereby determined.

The first lens 52 reduces the beam diameter of the light beams 56, 58 to a cross-section that is at a maximum still half as large as on the entry into the first lens 52. This reduced cross-section then only impinges a half of the second lens 54. The second lens 54 is thereby always only illuminated by light from one field point at a given position, but not from the field point disposed opposite with respect to the optical axis.

FIG. 5 illustrates these optical properties of the two-lens objective again in a plan view of the second lens 54. Light beams 56, 58 and 56', 58' of oppositely disposed field points do not overlap and do not reach the respective other half of the second lens 54 with respect to the optical axis. Laterally adjacent field points may also result in a specific overlap. The center of the second lens 54 remains without illumination.

These qualitatively explained properties can also be indicated more exactly with reference to of parameters of the two-lens objective. That distance d between the main plane of the first lens 52 and the first optically active surface of the second lens 54 is sought in which all the beams of a light bundle 56, 58 to a field point have completely arrived at one side with respect to the optical axis.

The main beam of the light bundle 56, 58 through the center of the first lens 52 has a lateral offset of tan α*d with a variably conceived d and the relevant marginal beam still has an additional lateral offset of (D1/2)f1*d, where D1 is the diameter used and f1 is the focal length of the first lens 52. Overall, the lateral offset should move the marginal beam beyond the optical axis. A lateral offset of d1/2 is necessary for this. The following inequality therefore has to be satisfied:

$$[(D1/2)/f1+\tan \alpha]*d \geq D1/2,$$

and this can be transformed into $$d \geq (D1*f1)/(D1+2*f1*\tan \alpha).$$

It is advantageous here to select a numerical value for d at least close to the equality. The greater the remaining difference in the inequality, the more the second lens 54 comes into direct proximity with the image plane and can there hardly still develop a useful effect.

The two lenses 52, 54 can be plano-convex, convex-plano, biconvex, and possibly also convex-concave or concave-convex; but in the last two cases still as a converging lens. Classically refractive lenses, Fresnel lenses, or diffractive optics and combinations thereof are possible. The two lenses 52, 54 can differ from one another or coincide with one another in these general shaping properties and effective principles. The two lenses 52, 54 can have different focal lengths f1, f2, different diameters D1, D2, and different shapes.

In an advantageous embodiment, not only the distance between the two lenses 52, 54 is selected with reference to the above-stated inequality, but the selection f2=d' is also made. d' here is the distance between the main planes of the lenses 52, 54 that is a little larger than the distance d depending on the center thickness of the second lens 54.

The front focal plane of the second lens 54 is placed in the main plane of the first lens 52 at this focal length f2. This has the consequence that the main beam runs in parallel with the optical axis in the image plane of the objective; the objective is then therefore telecentric at the image side. Inter alia on the use also as a transmission optics 24, this makes it possible that the light sources 22a may be aligned in parallel with one another and do not have to be slanted. Advantages also already result with a non-exact matching of the focal length f2 to the distance d', that is only f2~d', because the main beam angle at the image side is then already considerably reduced in size, albeit not down to 0°.

The diameter D2 of the second lens 54 is furthermore preferably only selected as large as the light beams 56, 58 that pass through require. The two-lens objective is then completely determined only by three parameters: The diameter D1 and the focal length f1 of the first lens 52 can be freely selected. The distance d of the second lens 54 results from the above-explained inequality. The focal length f2 is finally placed at the distance d'.

A total focal length f of the objective can also be calculated from these now known parameters using formulas of geometrical (paraxial) optics that are known per se. Conversely, the two-lens objective can only be fixed by its basic paraxial values: The focal length f of the objective, the aperture D=D1 of the objective, and the field angle α of the circular image field.

In a further preferred embodiment with a very large, but still achievable f-number k1:=D1/f1=1 of the first lens, the relationships are simplified in a very graphic manner:

$$d = f1/(1+2 \tan \alpha), \text{ for instance where } \alpha = 30°:$$
$$d = 0.5 * f1,$$

$$f2 = d' \approx d \approx f1/(1+2 \tan \alpha).$$

All the focal lengths f1, f2 and distances d or d' for the design of the two-lens objective are herewith given for this preferred embodiment for every desired field angle α and for every desired aperture D=D1. All these values can again where required also be directly obtained from the desired values f and D of the objective using the formulas known per se for the calculation of the total focal length of two combined lenses.

For reasons of completeness, a numerical example will be shown:
Objective focal length f=19 mm
Aperture D=20 mm (diameter of the lens 1)→k=D/f=1105)
First lens F2 glass: f1=29.8 mm, center thickness 4 mm, aspherically convex-plano
Second lens F2 glass: f2 21.6 mm, center thickness 5 mm, spherically convex-plano
Lens distance d=14.8 mm; distance of second lens from the image plane: 4.2 mm
Image field angle α=±15.4°
Spot diameter 20 μm (=approx. 1 mrad)

FIG. 6 shows an exemplary beam progression of the remitted transmitted light beam 28 in the reception path of a reception optics 30 that is designed as an objective having two lenses 52, 54 in accordance with the just presented principles. As already discussed in the introduction, the pass band of the filter 32 shifts with the angle of incidence. If non-parallel light is incident on the filter 32, different angles of incidence are produced and the pass band accordingly has to be designed with a tolerance that comprises the angle of incidence range. More extraneous light thereby also reaches the light receiver 34.

In order to manage with a pass band that is as narrow as possible, the filter 32 should therefore be arranged at a position in the optical path that only has an angle of incidence range that is as small as possible where the beams of the remitted transmitted light beam 28 therefore extend as parallel as possible with one another. There is generally no optimum position for this in a reception optics so that conventionally additional optical elements are independently used to parallelize the light incident on the filter.

Positions 60a-e are marked at different optical surfaces in the two-lens objective having the two lenses 52, 54 that is optimized to an off-axis field point corresponding to the image angle α. The filter 32 is arranged within a front screen 62 of the sensor 10 in front of the first lens 52 at the position 60 where the angle of incidence range only comprises 0.1°. The remitted transmitted light beam 28 is therefore almost perfectly parallel here. At other positions 60b-e, the angle of incidence range would be substantially larger and amounts to 43.8° at the position 60b of the curved entry surface of the first lens 52, then 34.4° at the position 60c of the planar rear side of the first lens 52, and 14.4° at the curved entry surface of the second lens 54 and 21.2° at the planar rear side of the second lens 54.

Due to the special adaptation of the reception optics 30 to an annular image field that is in turn particularly suitable for a circular arrangement of the reception points 34b, a position having an almost ideally parallelized remitted transmitted light beam 28, whose beams are practically incident on the filter 32 at the same angle is accordingly provided without additional optical elements. This applies at least to objects from a certain distance onward and they are as a rule the most critical energetically. A certain loss of useful light would therefore not result in measurement problems due to a wider angle of incidence range at a filter 32 adapted too narrowly thereto.

The filter 32 can consequently be arranged at the position 60a and can be designed as an interference filter with a very narrow band or can only be calculated for the one angle of incidence. The remaining divergence of the individual beams can almost be neglected depending on the maximum distance and aperture within the framework of all the tolerances. The front screen 62 itself is preferably formed as a plastic hood and is therefore not suitable as a substrate for a bandpass filter. It would, however, be conceivable in principle to apply the filter 32 directly to the front screen 62 or to integrate it there, for example by a corresponding coating.

The invention claimed is:

1. An optoelectronic sensor for the detection of objects in a monitored zone, the optoelectronic sensor comprising:
   a light transmitter for transmitting transmitted light of a wavelength range;
   a light receiver for generating a received signal from the transmitted light remitted at the objects;
   reception optics arranged upstream of the light receiver, the reception optics having an optical filter adapted to the wavelength range for the suppression of extraneous light that is arranged in a received beam path where the remitted transmitted light forms parallel bundles of beams; and
   a control and evaluation unit that is configured to detect information on the objects from the received signal,
   wherein the reception optics produces an annular image field having an image field angle, α, and the optical filter is positioned relative to the reception optics to filter a portion of the remitted transmitted light without a non-perpendicular angle of incidence corresponding to the image field angle.

2. The optoelectronic sensor in accordance with claim 1,
   wherein the reception optics has a first lens and a second lens, with the first lens being configured such that respective light beams of a single reception point only impact half the second lens with the image field angle.

3. The optoelectronic sensor in accordance with claim 2, wherein the inequality $$d \geq \frac{D1 \times f1}{D1 + 2f1 \times \tan \alpha}$$

is satisfied for the reception optics, with a focal length f1 and a diameter D1 of the first lens and a distance d between the first lens and the second lens applying.

4. The optoelectronic sensor in accordance with claim 3, wherein the inequality $$d = \frac{D1 \times f1}{D1 + 2f1 \times \tan \alpha}$$

is at least approximately satisfied.

5. The optoelectronic sensor in accordance with claim 1, wherein the reception optics does not have any additional optical element for the parallelization of the beams of the remitted transmitted light incident on the optical filter.

6. The optoelectronic sensor in accordance with claim 1, wherein the optical filter is arranged in front of the remaining elements of the reception optics.

7. The optoelectronic sensor in accordance with claim 1, wherein the optical filter has a narrow pass band only for the non-perpendicular angle of incidence corresponding to the image field angle.

8. The optoelectronic sensor in accordance with claim 1, wherein the light transmitter is configured to transmit a plurality of mutually separate light beams starting from a respective transmission point and the light receiver is configured to generate respective received signals from the respective remitted light beams incident at a reception point.

9. The optoelectronic sensor in accordance with claim 8, wherein the transmission points and/or the reception points are arranged on a circular line.

10. The optoelectronic sensor in accordance with claim 1, wherein the optoelectronic sensor is configured as a laser scanner, and further comprises a movable deflection unit with whose aid the transmitted light is periodically guided through the monitored zone.

11. The optoelectronic sensor in accordance with claim 10, wherein the deflection unit is configured in the form of a rotatable scanning unit in which at least one of the light transmitter and the light receiver is accommodated.

12. The optoelectronic sensor in accordance with claim 1, wherein the evaluation unit is configured to determine a distance of the objects from a time of flight between the transmission of the transmitted light and the reception of the remitted transmitted light.

13. A method of detecting objects in a monitored zone in which transmitted light of a wavelength range is transmitted, comprising:
   generating a received signal from the transmitted light remitted at the objects; and
   evaluating the received signal to detect information on the objects,
   wherein the remitted transmitted light is conducted through reception optics having an optical filter adapted to the wavelength range for the suppression of extraneous light that is arranged in a received beam path where the remitted transmitted light forms parallel beams, and
   wherein the reception optics produces an annular image field having an image field angle, $\alpha$, and the optical filter is positioned relative to the reception optics to filter a portion of the remitted transmitted light without a non-perpendicular angle of incidence corresponding to the image field angle.

* * * * *